United States Patent
Warren

(10) Patent No.: US 9,955,050 B2
(45) Date of Patent: *Apr. 24, 2018

(54) MOVEMENT MONITORING SECURITY DEVICES AND SYSTEMS

(71) Applicant: William J. Warren, Frisco, TX (US)

(72) Inventor: William J. Warren, Frisco, TX (US)

(*) Notice: Subject to any disclaimer, the term of this patent is extended or adjusted under 35 U.S.C. 154(b) by 136 days.

This patent is subject to a terminal disclaimer.

(21) Appl. No.: 15/008,390

(22) Filed: Jan. 27, 2016

(65) Prior Publication Data

US 2016/0142597 A1 May 19, 2016

Related U.S. Application Data

(63) Continuation-in-part of application No. 14/468,721, filed on Aug. 26, 2014, now Pat. No. 9,613,231.

(60) Provisional application No. 61/995,290, filed on Apr. 7, 2014, provisional application No. 62/199,336, filed on Jul. 31, 2015.

(51) Int. Cl.
| | |
|---|---|
| *H04N 5/225* | (2006.01) |
| *G06T 7/20* | (2017.01) |
| *G06K 9/00* | (2006.01) |
| *H04N 7/18* | (2006.01) |
| *G06F 21/86* | (2013.01) |

(52) U.S. Cl.
CPC .......... *H04N 5/2252* (2013.01); *G06F 21/86* (2013.01); *G06K 9/00771* (2013.01); *G06T 7/20* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 6,118,375 A | 9/2000 | Duncan | |
| 6,133,830 A | 10/2000 | D'Angelo et al. | |
| 6,788,216 B2 | 9/2004 | Chen | |
| 7,855,642 B2* | 12/2010 | Veiga, III | G08B 13/1436 340/539.1 |
| 9,613,231 B2 | 4/2017 | Warren | |
| 2002/0147982 A1* | 10/2002 | Naidoo | G08B 13/19645 725/105 |
| 2004/0145471 A1 | 7/2004 | Lawrenson et al. | |

(Continued)

FOREIGN PATENT DOCUMENTS

WO    WO2015156959 A1    10/2015

OTHER PUBLICATIONS

Office Action, dated Aug. 10, 2016, U.S. Appl. No. 14/468,721, filed Aug. 26, 2014.

(Continued)

*Primary Examiner* — Kate Luo
(74) *Attorney, Agent, or Firm* — Carr & Ferrell LLP

(57) ABSTRACT

Motion sensing devices for computer security are provided herein. In various embodiments, a security device includes a sensor for detecting movement of a computing device to which the security device is coupled, a transmitter, a processor, a memory, and instructions that are executed to receive from the sensor a message indicative of the movement of the computing device, determine if the computing device has been moved using the sensor message, and activate a camera to obtain image or video of an area proximate the computing device.

19 Claims, 17 Drawing Sheets

(56) References Cited

U.S. PATENT DOCUMENTS

| | | | |
|---|---|---|---|
| 2005/0073585 A1* | 4/2005 | Ettinger | H04N 7/18 348/155 |
| 2008/0014869 A1 | 1/2008 | Demirbasa et al. | |
| 2008/0072633 A1 | 3/2008 | Samuel | |
| 2009/0009326 A1* | 1/2009 | Veiga, III | G08B 13/1436 340/541 |
| 2009/0179142 A1* | 7/2009 | Duparre | G02B 3/0031 250/208.1 |
| 2010/0141425 A1 | 6/2010 | Tracey et al. | |
| 2010/0195810 A1* | 8/2010 | Mota | H04N 7/186 379/167.12 |
| 2012/0302226 A1* | 11/2012 | Jesudason | H04W 4/008 455/420 |
| 2012/0317779 A1 | 12/2012 | Myers et al. | |
| 2013/0165138 A1 | 6/2013 | Bahl et al. | |
| 2013/0172004 A1 | 7/2013 | Bahl et al. | |
| 2013/0238455 A1* | 9/2013 | Laracey | G06Q 20/108 705/21 |
| 2014/0055612 A1* | 2/2014 | Hinkel | G08B 13/19656 348/143 |
| 2014/0118554 A1* | 5/2014 | Bucknor | H04N 5/2251 348/155 |
| 2015/0240531 A1 | 8/2015 | Blust et al. | |
| 2015/0286845 A1 | 10/2015 | Warren | |
| 2017/0124825 A1 | 5/2017 | Warren | |

OTHER PUBLICATIONS

Notice of Allowance, dated Nov. 30, 2016, U.S. Appl. No. 14/468,721, filed Aug. 26, 2014.

International Search Report and Written Opinion dated Jun. 24, 2015 for Patent Cooperation Treaty Application PCT/US2015/020600, filed Mar. 13, 2015.

Office Action, dated Oct. 4, 2017, U.S. Appl. No. 15/404,137, filed Jan. 11, 2017.

* cited by examiner

MOVEMENT MONITORING SECURITY DEVICES AND SYSTEMS

CROSS-REFERENCE TO RELATED APPLICATIONS

The present application is a Continuation-in-Part of U.S. patent application Ser. No. 14/468,721 (now issued as U.S. Pat. No. 9,613,231 on Apr. 4, 2017), filed on Aug. 26, 2014, which claims the benefit of U.S. Provisional Application No. 61/995,290, filed on Apr. 7, 2014; this application also claims the benefit of U.S. Provisional Application No. 62/199,336, filed on Jul. 31, 2015. All of these applications are hereby incorporated by reference herein in their entireties, including all references cited therein.

FIELD

The present technology relates generally to computing device security and, more specifically, but not limited to, movement monitoring security devices that detect unauthorized movement of computing devices and output warnings indicative of the same.

SUMMARY

According to some embodiments, the present technology may be directed to a security device, comprising: (a) security device, comprising: (i) a sensor for detecting movement of a computing device to which the security device is coupled or movement of an individual proximate the computing device; (ii) a transmitter; (iii) a camera positioned on the computing device so as to capture an area proximate the computing device; (iv) a processor; and (v) a memory for storing executable instructions, the processor executing the instructions to: (1) receive from the sensor messages indicative of the movement of the computing device or movement of the individual proximate the computing device; (2) determine if the computing device has been moved or if the individual is proximate the computing device, using the sensor messages; (3) control the camera to obtain images or video of the area proximate the computing device; and (4) transmit the images or video through the transmitter to a mobile device of a user.

According to some embodiments, the present technology may be directed to a security system, comprising: (a) a security device comprising: (i) a sensor for detecting movement of a computing device or movement of an individual proximate the computing device; (ii) means for communicatively coupling the sensor with the computing device; and (iii) a camera configured to capture an area proximate the computing device; and (b) the computing device comprising: (1) a processor; and (2) a memory for storing executable instructions, the processor executing the instructions to: (A) receive from the sensor messages indicative of the movement of the computing device; (B) determine if the computing device has been moved or if the individual is proximate the computing device, using the sensor messages; (C) control the camera to obtain images or video of the area proximate the computing device; and (D) transmit the images or video through the transmitter to a mobile device of a user.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
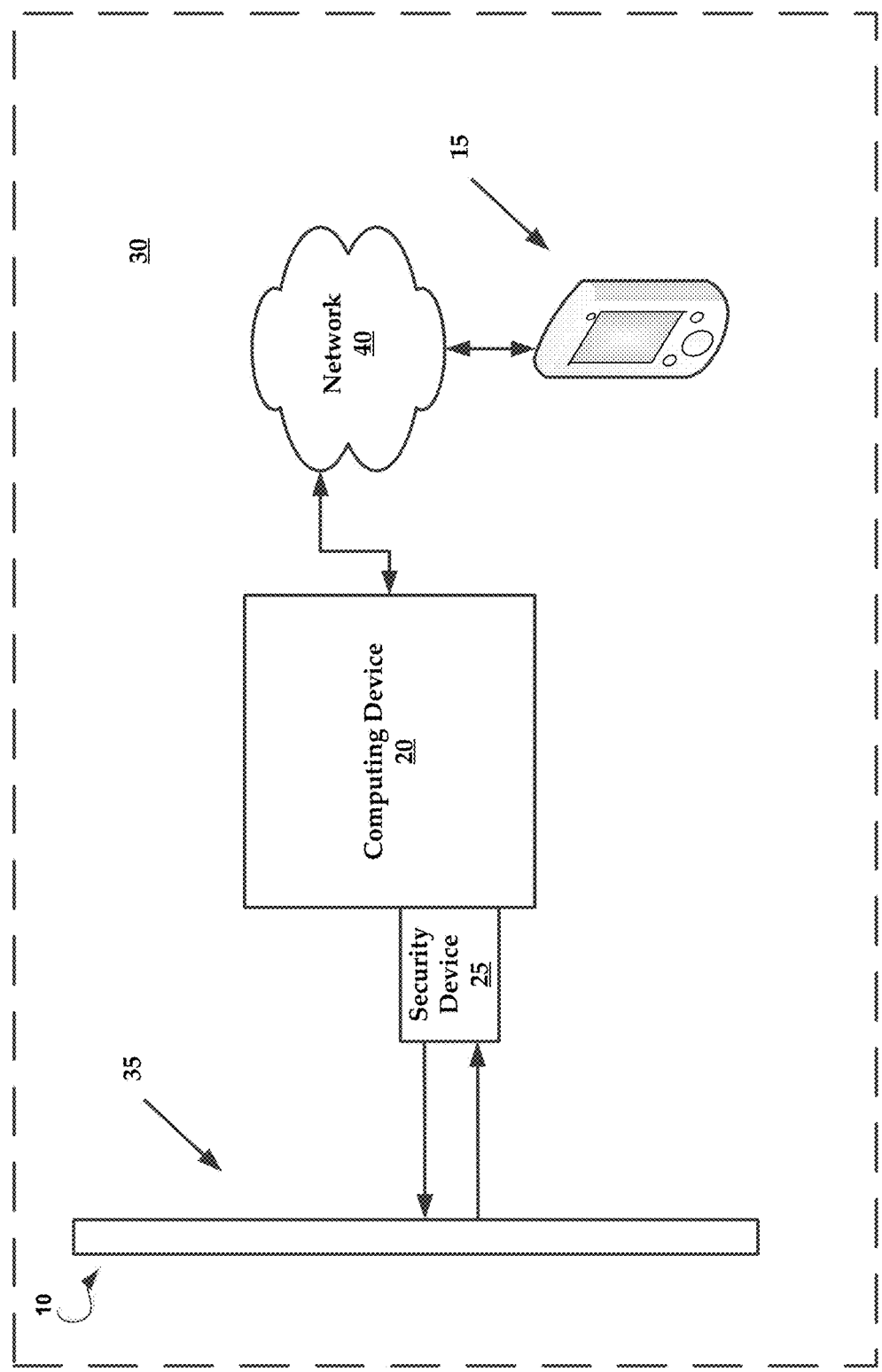
FIG. 1 is a schematic view of an environment that includes a security system having a security device of the present technology that is coupled to a computing device, the computing device being disposed within the environment.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Turning now to FIG. 1, an example security system 10 is illustrated. The system 10 generally comprises a mobile device 15, a computing device 20, a security device 25, and an environment 30 that includes at least one object 35. It will be understood that in some instances, the system 10 may include other combinations of components such as computing device 20 and security device 25, such that the mobile device 15 is not present. Also, in some embodiments, the security device 25 can be embedded or integrated into the computing device 20 or into a protective cover (see FIG. 3) for the computing device 20.

The environment 30 includes any location at which the computing device 20 is positioned. For example, the computing device 20 is located in a coffee shop, a library, or other location. Located within the environment are objects, such as the at least one object 35. The objects in the environment include, for example, tables, chairs, walls, ceilings, individuals, and so forth. These objects are located proximal or distant from the computing device 20. In some embodiments, the sensor(s) used in some embodiments of the security device 25 use motion sensing features that employ ultrasonic or Doppler wave measurements which reflect sound or microwave signals off of the objects within the environment 30 as a means to determine the movement of the computing device 20. Additional details regarding these movement detection methods will be provided infra.

Broadly, the security device 25 is configured to sense movement of the computing device 20 and output a warning to the computing device's owner that the computing device 20 has moved. In some instances, the security device 25 can sense the gyration of the computing device 20 rather than a more deliberate movement such as picking up or carrying of the computing device 20. Warnings can be tailored or scaled to whether the computing device 20 has been moved or gyrated. The word gyrated will be understood to include bumping, oscillating, tapping, or other small movements of the computing device 20. The security system 25 is configured to output different types or combinations of warning messages depending upon whether the computing device 20 has been gyrated or moved. Again, additional details regarding these specific features are provided in greater detail below.

In other embodiments, the sensors used with the security device 25 can determine movement of individuals proximate the computing device 20. For example, the passive infrared (IR) and other heat sensors can be used to determine if individuals are proximate the computing device 20. Using the sensor message generated by these types of sensors, the security device 25 can output various warning messages. The user can set the sensitivity level of the security device 25. For example, the user can specify that the sensor should detect a consistent heat signature proximate the computing device 20 for at least thirty seconds before outputting a warning message.

The mobile device 15 may pair/couple with the security device 25 using any wired or wireless methodologies. Generally, the wireless methods will form a network or communications path (hereinafter "network 40"). An example of a network may include a telecommunications network, a Bluetooth pairing, infrared (IR), near field communications (NFC), or other similar methods for communicatively linking the security device 25 with the mobile device 15.

The network 40 may include any one of a number of private and public communications mediums such as the Internet. Other suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 40 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The mobile device 15 may comprise an application that controls the arming and disarming of the security device 25, and the application can display warning messages received from the security device 25. The application is stored in memory and executed by the processor of the mobile device 15. Suitable examples of a processor and memory are found with respect to the computing device or machine of FIG. 16.

FIGS. 2-13 individually and collectively illustrate example security devices that can be utilized in accordance with the present technology. Some descriptions of operational features of security devices illustrated in FIGS. 2-13 may refer back to components described in FIG. 1 for purposes of context and operating environment.

Figure 2:
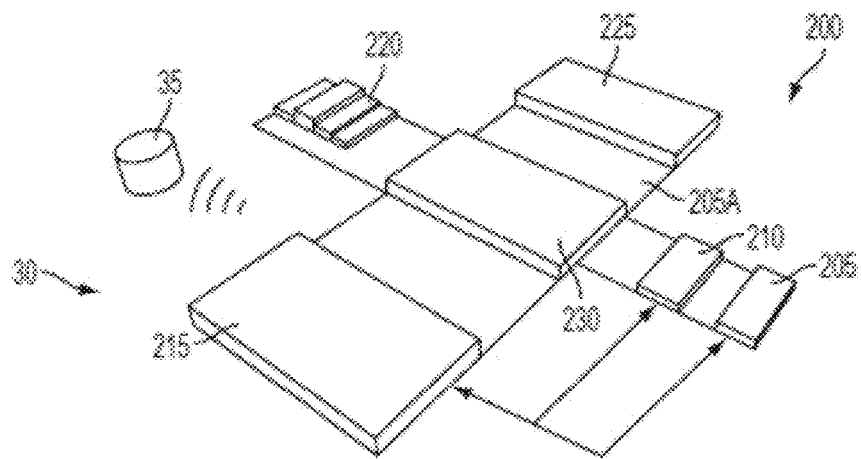
FIG. 2 is a perspective view of an example security device that is integrated into a chassis of a computing device.

FIG. 2 is a schematic diagram of an example security device 200, constructed in accordance with the present technology. The security device 200 generally comprises a computing interface 205, a power converter 210, a processor or CPU 215, a transmitter 220, an audio device 225, and motion sensor 230, and an object 35 (see FIG. 1) that is included in an environment 30 in which the security device 200 is positioned.

The components of the security device 200 outlined above can be coupled or fabricated onto a substrate 205A. The substrate 205A is, in some embodiments, integrated into a motherboard of a computing device. In another example, the substrate 205A is a standalone substrate that can be stored with a housing. Other embodiments described herein illustrate a security device that is positioned within a housing or enclosure.

The computing interface 205 can include any physical interface that would allow the security device 200 to communicatively and/or electrically couple with the computing device. For example, the computing interface 205 may include a serial port connector, a USB port connector, a firewire connector, a headphone jack, or any other physical connection type that would be known to one of ordinary skill in the art with the present disclosure before them.

The power converter 210 is an optional component that is used when the security device 200 draws power from an external power source such as the battery of a computing device. The power converter 210 can modify input power received from the computing device, either stepping the input power down or amplifying the input power to meet the needs of the components of the security device 200. In some embodiments, the security device 200 comprises an integrated power source such as a battery (not shown).

The processor 215 is configured to store various algorithms that are used to detect the movement or gyration of the computing device 20 (see FIG. 1). The types of algorithms used to detect movement or gyration depend upon the type of motion sensor(s) that are included in the security device 200. Use case examples of certain combinations of sensors and thresholds will be described in greater detail below.

The motion sensor 230 may include a single sensor or a plurality of sensors. The plurality of sensors can include a plurality of the same type of sensors or many different combinations and permutations of motion sensors. Examples of motion sensors include, but are not limited to, accelerometers, passive infrared sensors that detect body heat from individuals, ultrasonic sensors that sense the movement of the sensors relative to other objects adjacent to the sensors, microwave sensors, and tomographic sensors or network of tomographic sensors, as well as combinations thereof—just to name a few. Other suitable motion sensors may also likewise be utilized in accordance with the present technology.

Figure 3:
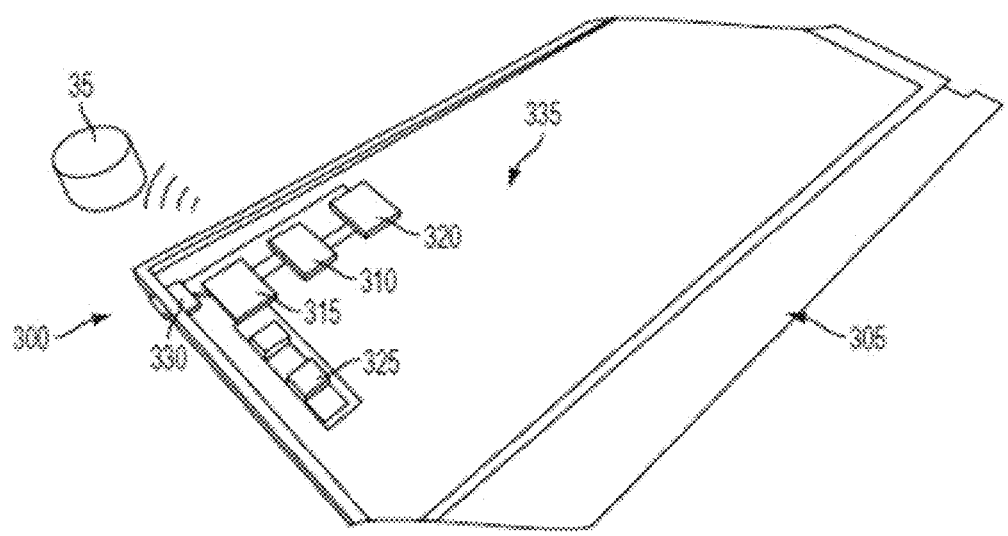
FIG. 3 is a perspective view of an example security device that is integrated into a protective cover for a computing device.

FIG. 3 is a perspective view of another example security device 300 that is integrated into a protective cover 305 for a computing device. The components of the security device 300 can be embedded into the protective cover 305 or the components can be attached to an outer surface of the protective cover 305 in a recess 335 formed into the protective cover 305. As with the security device 200 of FIG. 2, the security device 300 of FIG. 3 comprises a motion senor or sensors 310, an audio device 315 such as a speaker, a processor or CPU 320, a transmitter 325, and an interface 330 for coupling with a computing device.

Figure 4:
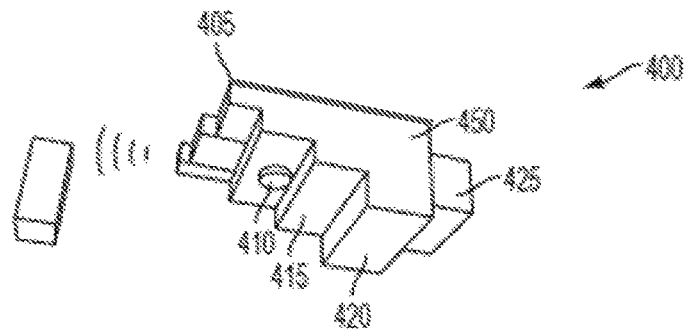
FIG. 4 is a perspective view of an example security device with a layer component configuration.

FIG. 4 is a perspective view of another example security device 400 where the components are in a stacked configuration. More specifically, the security device 400 comprises a transmitter 405 that is transverse and above an audio device 410. The audio device 410 is transverse and above a motion sensor 415. The motion sensor 415 is transverse and above a power unit 420. The security device 400 includes a physical interface 425, such as a USB interface that extends from the power unit 420. The device also comprises a processor or CPU that is enclosed in a housing 450 that houses all of the components except the interface 425.

Figure 5:
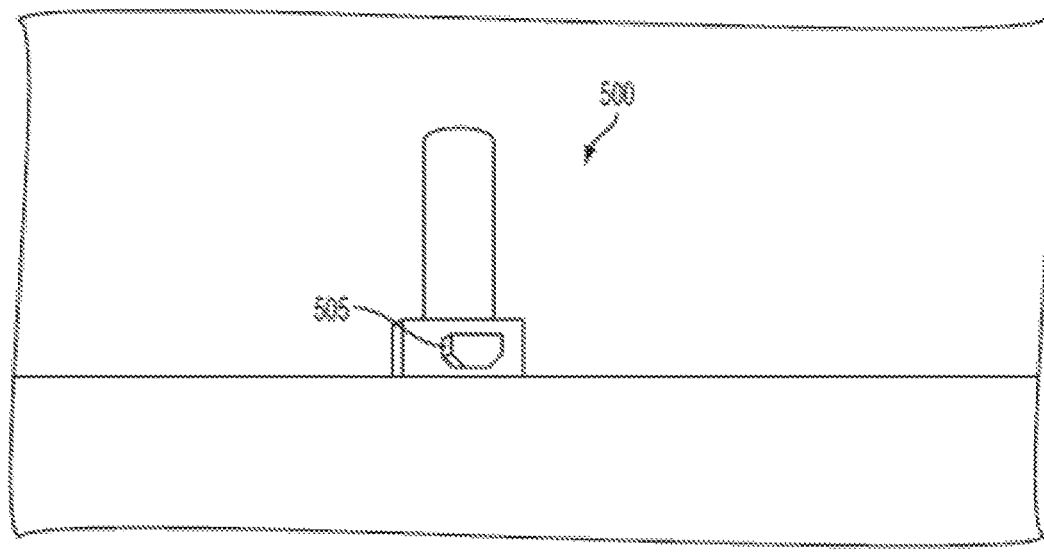
FIGS. 5-9 are perspective views of additional embodiments of different security devices, each having different means for coupling with a computing device.
Figure 6:
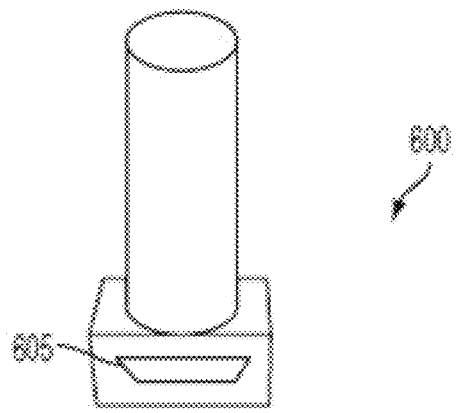
Figure 7:
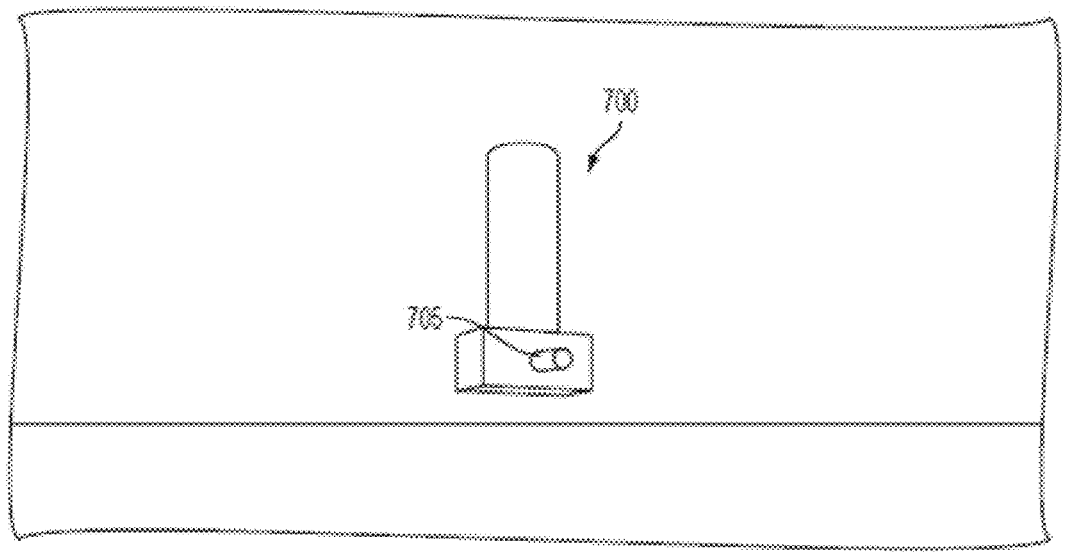
Figure 8:
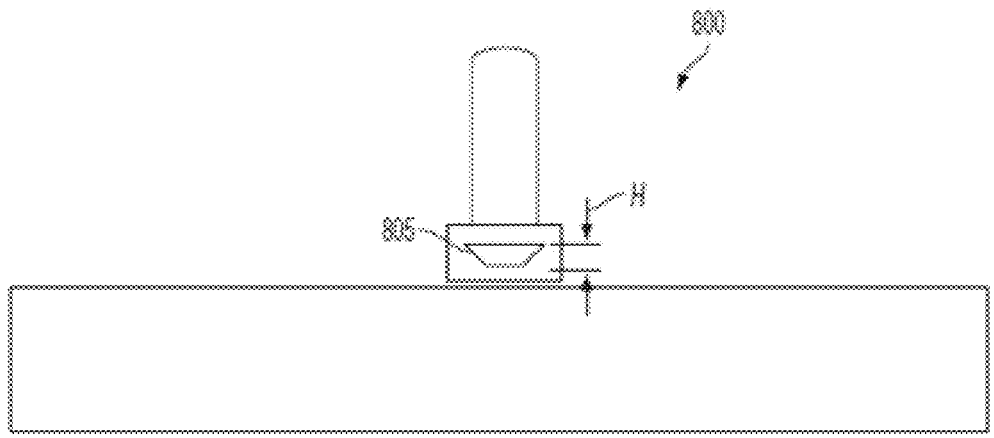

FIG. 5 illustrates an example security device 500 that comprises a USB connector 505. FIG. 6 illustrates an example security device 600 that comprises a serial port connector 605. FIG. 7 illustrates an example security device 700 that has a pin connector 705. FIG. 8 illustrates an example security device 800 that includes a locking connector 805. The locking connector 805 is configured to be difficult to remove when the locking connector 805 mates with a physical interface of the computing device. For example, the locking connector 805 may have a shape with a large upper section and a relatively smaller lower section, forming a trapezoid. The larger upper section is sized such that the locking connector 805 is difficult but not impossible to remove from a computer interface. For example, a trapezoidal shape of the locking connector 805 will ensure that the locking connector 805 is removable in a directional manner. In one embodiment, the trapezoidal shape of the locking connector 805 ensures that the locking connector 805 can only be removed by pulling along a linear axis of the locking connector 805, where the linear axis extends along a centerline that runs through a center point of the locking connector 805 (the center point would be in the center of the face illustrated in FIG. 8).

Figure 9:
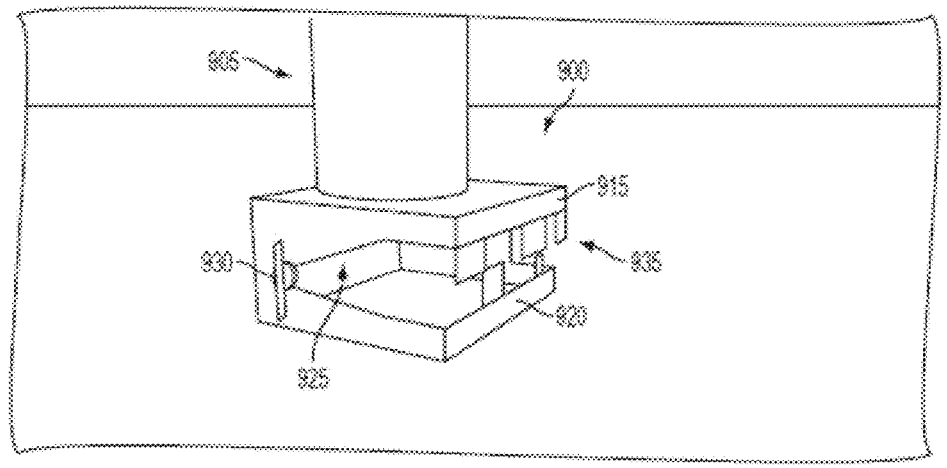

FIG. 9 is another example connector 900 that can couple a security device 905 with a computing device. The connector 900 comprises a clamp that has an upper bracket 915 and a lower bracket 920 that are spaced apart to form a groove 925. The groove 925 receives a portion of a computer, such as a chassis or screen. A locking knob 930 can be turned to move the upper bracket 915 and lower bracket 920 towards one another to decrease the size of the groove and aid the connector 900 in clamping around an object. The connector 900 can also comprise resilient teeth 935 that can also exert forces on the portion of the computing device held within the groove 925. The teeth 935 can be formed from a plastic, a rubber, or any other resilient material.

Figure 10:
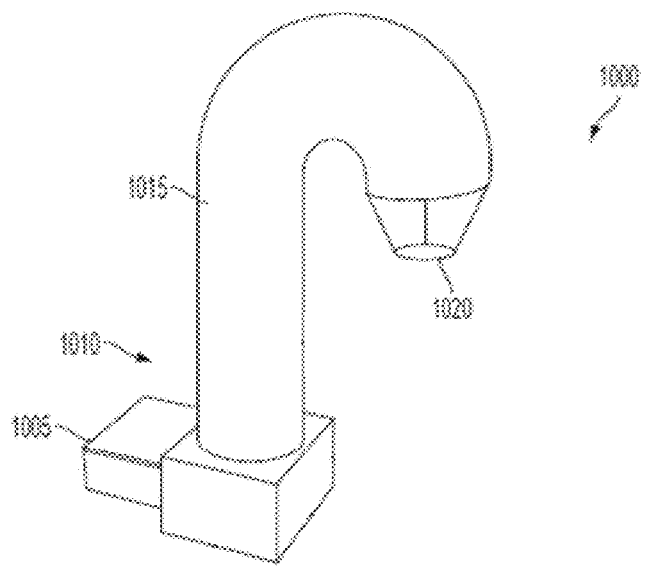
FIG. 10 is a perspective view of an example security device that has a flexibly positionable motion sensor.

FIG. 10 is another example security device 1000. The security device 1000 generally comprises an interface 1005, a housing 1010, a flexible connector 1015, and a motion sensor 1020. While not shown, the security device 1000 includes, in some embodiments, a CPU, a power unit, a transmitter, and other components described in the various other embodiments.

The flexible connector 1015 allows the motion sensor 1020 to be flexibly positioned in any direction 360 degrees relative to the security device 1000, as well as any object 35 (see FIG. 1) in the general area of the security device 1000. For example, the object 35 may include a table on which a computing device is positioned. The motion sensor 1020 is positioned to point downwardly to face the object 35. Because the motion sensor 1020 can be either an ultrasonic senor or a microwave sensor that each use waves to detect distances, the motion sensor 1020 of the security device 1000 can determine when the sensed distance changes, indicating that the computing device has been moved. If the sensor comprises a passive IR device or a tomographic sensor, the flexible connector 1015 can be positioned so that the sensor is in a position that is optimal for the sensor to detect movement. For example, if the sensor is a passive IR sensor, the sensor could be positioned to point at a position directly in front of the display of the computing device to detect heat signatures in front of the computer. The flexible connector 1015 may be referred to as a means for positioning a sensor.

Figure 11:
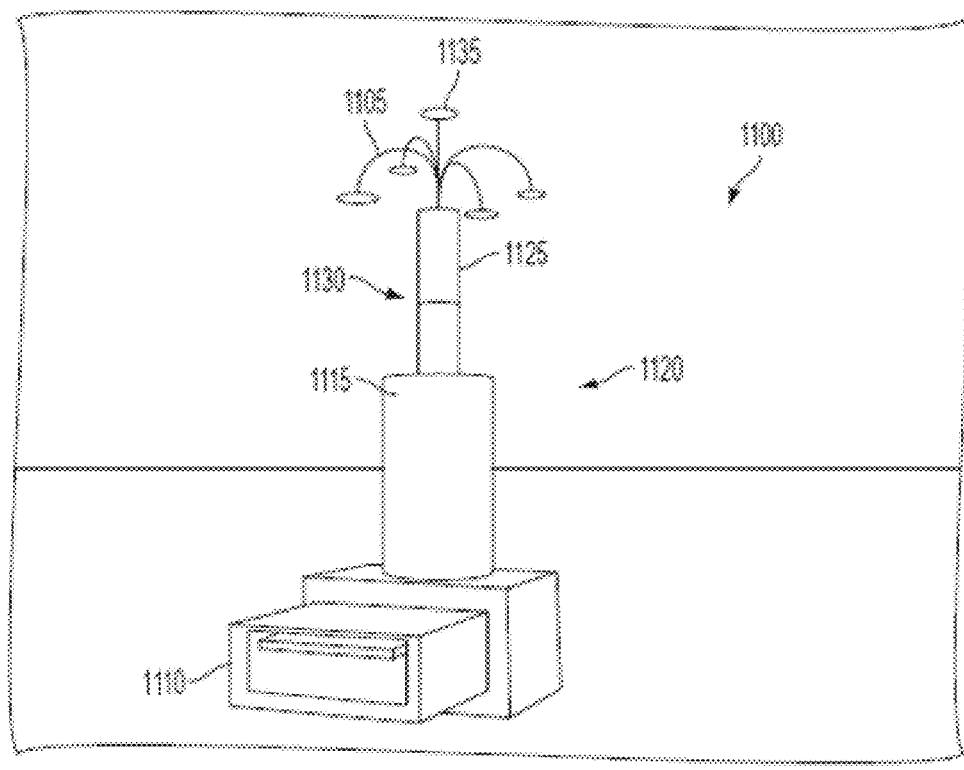
FIG. 11 is a perspective view of another example security device that has a flexibly positionable motion sensor.

FIG. 11 illustrates another example security device 1100 that also comprises a flexible connector 1105. The security device 1100 also comprises an interface 1110 for coupling the device with a computing device, as well as an audio device 1115, a housing 1120 that encloses a CPU (not shown but referenced in other figures such as FIG. 2). The security device 1100 also comprises a transmitter 1125. The transmitter 1125 can be housed in a column enclosure 1130 that extends from the housing 1120.

The flexible connector 1105 extends from the column enclosure 1130 and a sensor 1135 for the security device 1100 is connected to a terminal end of the flexible connector 1105. In this embodiment, the flexible connector 1105 can include a flexibly positionable cable or wire that allows the sensor 1135 to be directed in any position 360 degrees relative to the security device 1100. FIG. 11 illustrates the sensor 1135 in various positions. Again, the positioning of the sensor 1135 depends on the sensor used in the security device 1100.

Figure 12:
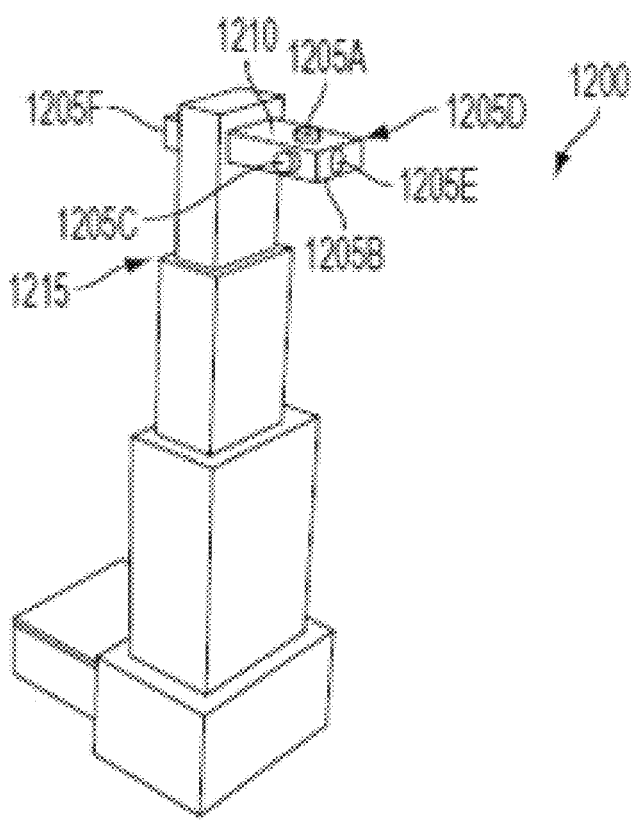
FIG. 12 illustrates an example security device that comprises a plurality of motion sensors that cover a 360 degree sensing area.

FIG. 12 illustrates another embodiment of a security device 1200. The security device is constructed with components similar to those of FIGS. 2-11. The security device 1200 includes a set of sensors 1205A-F that are positioned on a platform 1210 that extends normally to a housing 1215 that houses the components of the security device 1200 such as a transmitter and CPU.

The platform 1210 has a first sensor 1205A positioned on a top of the platform 1210, a second sensor 1205B positioned on a bottom of the platform 1210, and third and fourth sensors 1205C and 1205D which are positioned on opposing sides of the platform 1210. A fifth sensor 1205E is located on the platform 1210 on an outward side of the platform 1210. A sensor 1205F is located on the platform 1210 on a side of the platform 1210 that extends from an opposing side of the housing 1215. That is, part of the platform is positioned on one side of the housing 1215, while another part of the platform 1210 is positioned on an opposing side of the housing 1215. It will be understood that fewer or more sensors can be used.

In this example, the security device includes a plurality of sensors because each of the sensors 1205A-F is capable of sensing only in a directional manner. Thus, to cover a wider area, many sensors are used. In some embodiments, the plurality of sensors 1205A-F are identical sensors. In other embodiments, the plurality of sensors 1205A-F include different types of sensors. For example, the plurality of sensors include one accelerometer, two or more ultrasonic sensors, and at least one passive IR sensor.

Figure 13:
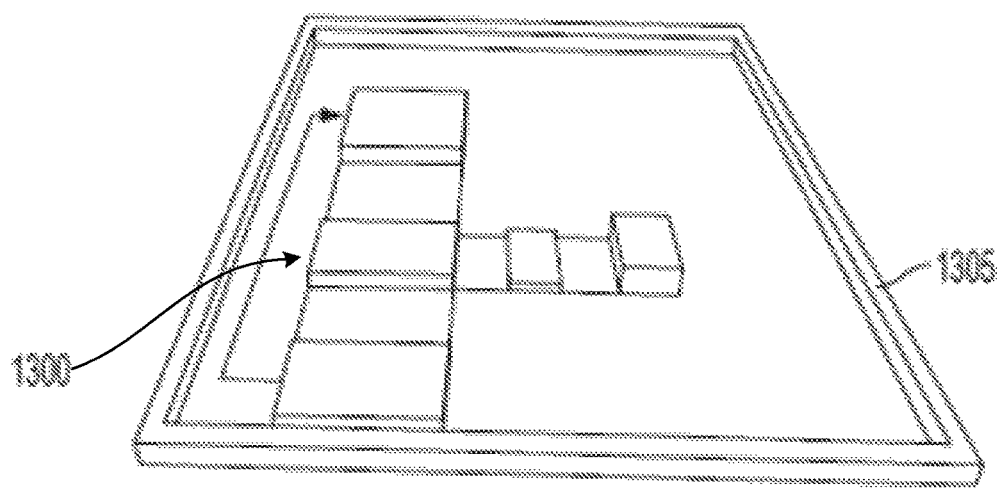
FIG. 13 illustrates an example security device that is embedded or integrated into a chassis of a computing device.

FIG. 13 illustrates an example security device 1300 that is embedded into a chassis 1305 of a computing device. For example, the chassis 1305 may include a bottom portion of a frame or case of a computing device.

Figure 14A:
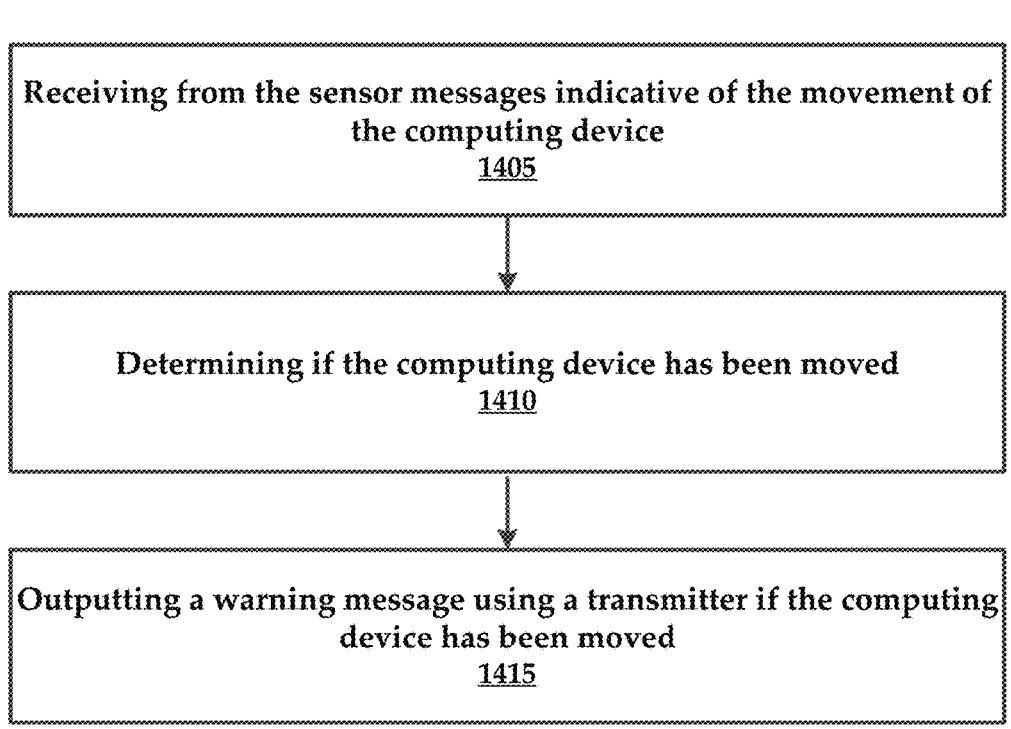
FIG. 14A is a flowchart of an exemplary method for securing a computing device based on movement of the security device.

FIG. 14A is a flowchart of an exemplary method for securing a computing device based on movement of the security device. The method can be executed by one or more of the security devices described herein. The method includes receiving from the sensor messages indicative of the movement of the computing device 1405. For example, if the sensor is an accelerometer, the accelerometer can determine movement of the computing device by detecting changes in acceleration of the accelerometer.

In another example, movement of the security device can be sensed using an ultrasonic sensor or other similar sensor that measures distances between the sensor and adjacent objects. When the distance between the sensor and the adjacent objects changes, the CPU of the security device can determine that the security device has moved, and therefore the computing device to which the security device is connected.

The method can further include determining if the computing device has been moved 1410. Again, the CPU calculates this determination by executing instructions that allow the CPU to process sensor messages indicative of the movement of the computing device. Again, the exact methods used by the CPU will depend on the type of sensor used. For example, the CPU can measure changes in acceleration if the sensor is an accelerometer. If the sensor is an ultrasonic sensor, the CPU can be configured to measure changes in distance as detected by the sensor.

If no movement is detected, the CPU can take no action. If movement of the security device is detected, the method includes outputting a warning message using a transmitter if the computing device has been moved 1415.

Figure 14B:
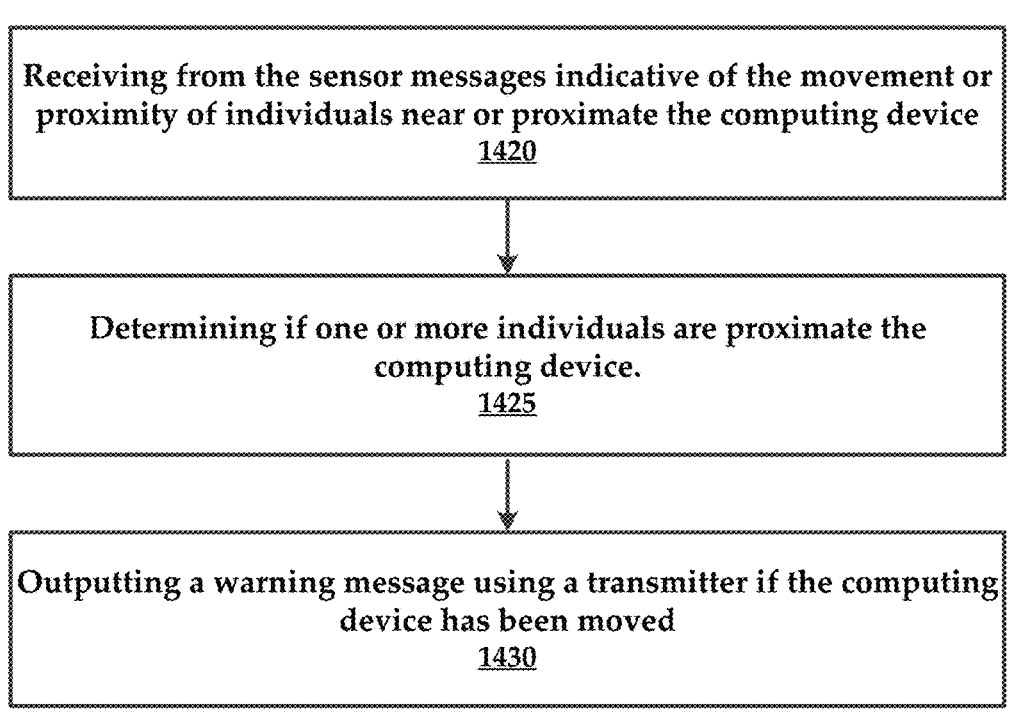
FIG. 14B is a flowchart of an exemplary method for securing a computing device based on presence and proximity of individuals to the security device.

FIG. 14B is a flowchart of an exemplary method for securing a computing device based on presence and proximity of individuals to the security device. The method can be executed by one or more of the security devices described herein such as a passive IR or heat sensor. The method includes receiving from the sensor messages indicative of the movement or proximity of individuals near or proximate the computing device 1420. For example, if the sensor is a passive IR sensor, the passive IR sensor can sense heat signatures from individuals who are near the computer.

The method can further include determining if one or more individuals are proximate the computing device 1425. Again, the CPU calculates this determination by executing instructions that allow the CPU to process sensor messages indicative of individuals that are proximate the computing device. Again, the exact methods used by the CPU will depend on the type of sensor used. For example, the CPU can measure changes in heat signatures or patterns measured by the passive IR sensor. The CPU can establish thresholds for heat signatures, above which it is assumed that someone is in close proximity to the security device or computing device. Lower heat signature values indicate that individuals may be passing by the device but not close enough to require a warning.

If no individuals are proximate, the CPU can take no action. If individuals are determined to be proximate the security device, the method includes outputting a warning message using a transmitter if the computing device has been moved 1430.

In some instances, the methods of FIGS. 14A and 14B are executed concurrently such that the security can determine both movement/gyration of the computing device, as well as the presence or proximity of individuals to the computing device. In these instances, it will be understood that the security device would comprise at least two types of sensors, one for sensing the movement/gyration of the device and a second for sensing the presence or proximity of individuals to the computing device.

Figure 15:
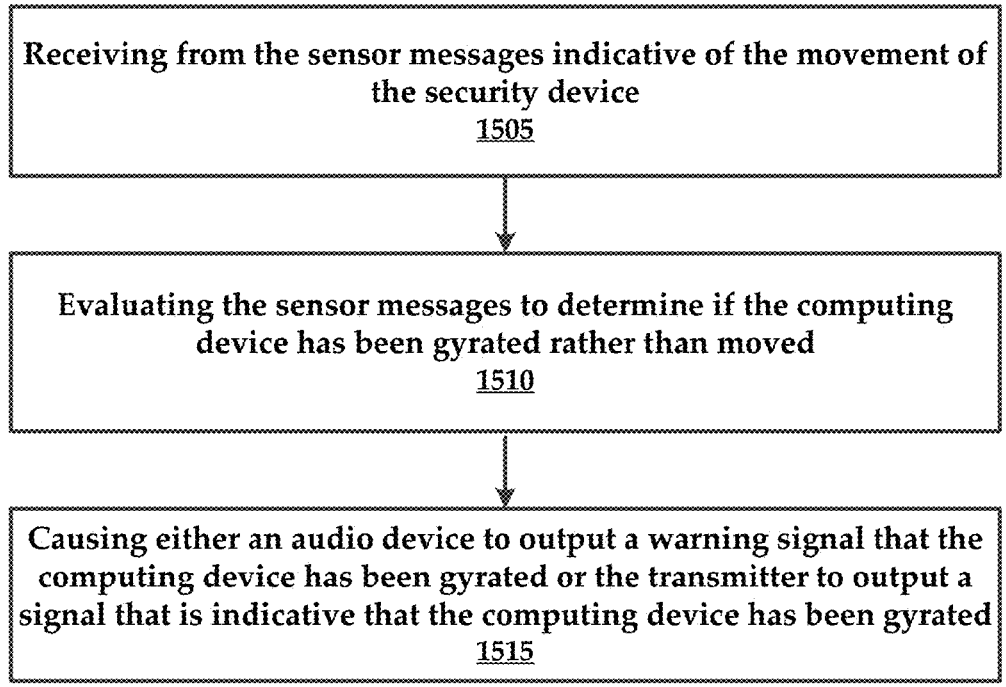
FIG. 15 is a flowchart of an exemplary method for selectively outputting warning messages in accordance with detected movement or gyration.

FIG. 15 is a flowchart of an exemplary method for selectively outputting warning messages in accordance with detected movement or gyration. It is assumed for this example that the sensor is an accelerometer and that the security device is coupled to a computing device. The CPU can use established rules that are stored in memory and allow the CPU to evaluate if the security device has been moved or merely gyrated (e.g., bumped).

The method includes receiving from the sensor messages indicative of the movement of the security device 1505. To be sure, because the security device is coupled with the computing device, it is assumed that movement of the security device is also indicative of movement of the computing device.

The method includes evaluating the sensor messages to determine if the computing device has been gyrated rather than moved 1510. For example, the CPU can compare sensor messages from the accelerometer to a rule that specifies that if the acceleration is short lived (for example, a second or two), that the security device has been gyrated or bumped rather than moved. If the acceleration is long lived (for example, ten seconds or more or continuous), the security device should be considered by the CPU as having been moved.

Different warning messages can be output based on whether the CPU detects gyration or movement. For example, the CPU will output a short audio warning tone if gyration is detected. On the other hand, the CPU will output a warning message for display on either the computing device or the mobile device and a long audio warning tone if the security device detects movement.

Thus, the method includes causing either an audio device to output a warning signal that the computing device has been gyrated or the transmitter to output a signal that is indicative that the computing device has been gyrated 1515.

In some embodiments, the security device is paired with a mobile device over a communications path. Thus, the method may include outputting the warning messages by a transmitter of the security device to the mobile device over the communications path.

Returning back to FIG. 1, in an example use of a security device and system, an end user of the computing device 20 desires to walk away from the computing device 20. The end user secures the computing device 20 by inserting the security device 25 into a physical port of the computing device 20. Again, the exact physical port chosen will depend upon the interface included on the security device 25. In this example, it is assumed that the security device 25 includes a USB connector and the USB connector is inserted into a USB port of the computing device 20.

In some instances, when the security device 25 is coupled with the computing device 20, the security device 25 automatically arms and begins sensing either: (1) the motion of the computing device; (2) or the presence or motion of individuals proximate the computing device 20. The word "proximate" will be understood to be a relative term that depends upon the capabilities of the sensing device used in the security device 25. For example, one type of sensor may be capable of sensing the presence of individuals who are one to three feet away from the computing device 20, while another type of sensor may be capable of sensing individuals who are up to five feet away from the computing device 20. The proximity of an individual to the computing device 20 is a distance of the individual from the computing device 20. The proximity of the individual can also refer to the presence of the individual in front or near the computing device 20. Thus, an individual is "proximate" the computing device 20 if the individual is sitting in front of the computing device 20 or holding the computing device 20, in two examples.

Assuming the sensor included in the security device 25 includes an accelerometer, the CPU of the security device 25 will begin receiving signals from the accelerometer and determining if the computing device 20 has moved or has been gyrated. In the example, while the end user of the computing device 20 is away, a second individual picks up the computing device 20 and moves the computing device 20. The accelerometer outputs signals that are interpreted by the CPU as movement. The CPU outputs a warning message such as activating the audio device (e.g., speaker) of the security device 25 to output a warning tone, alerting those around that the computing device 20 has been moved.

In a second use case example, it will be understood that the security device 25 is coupled with the mobile device 15. When the security device 25 is inserted into the computing device 20 it is in an unarmed state, meaning that it is not sensing movement. The security device 25 pairs with the mobile device 15. The mobile device 15 can transmit to the security device 25 an arming signal that causes the security device 25 to determine movement.

When the security device 25 senses movement of the security device 25/computing device 20, the security device 25 not only outputs a warning message that includes activating the speaker to output a warning tone, but the security device 25 transmits a warning message to the mobile device 15 over the network 40. In one example, the mobile device 15 can display a message that the security device 25/computing device 20 have moved. In another example, the mobile device 15 can display a message that the security device 25/ computing device 20 have moved and may also output a warning tone using the speaker of the mobile device 15. The warning tone alerts the end user of the mobile device 15 and can display a message that the security device 25/computing device 20 have moved.

Figure 16:
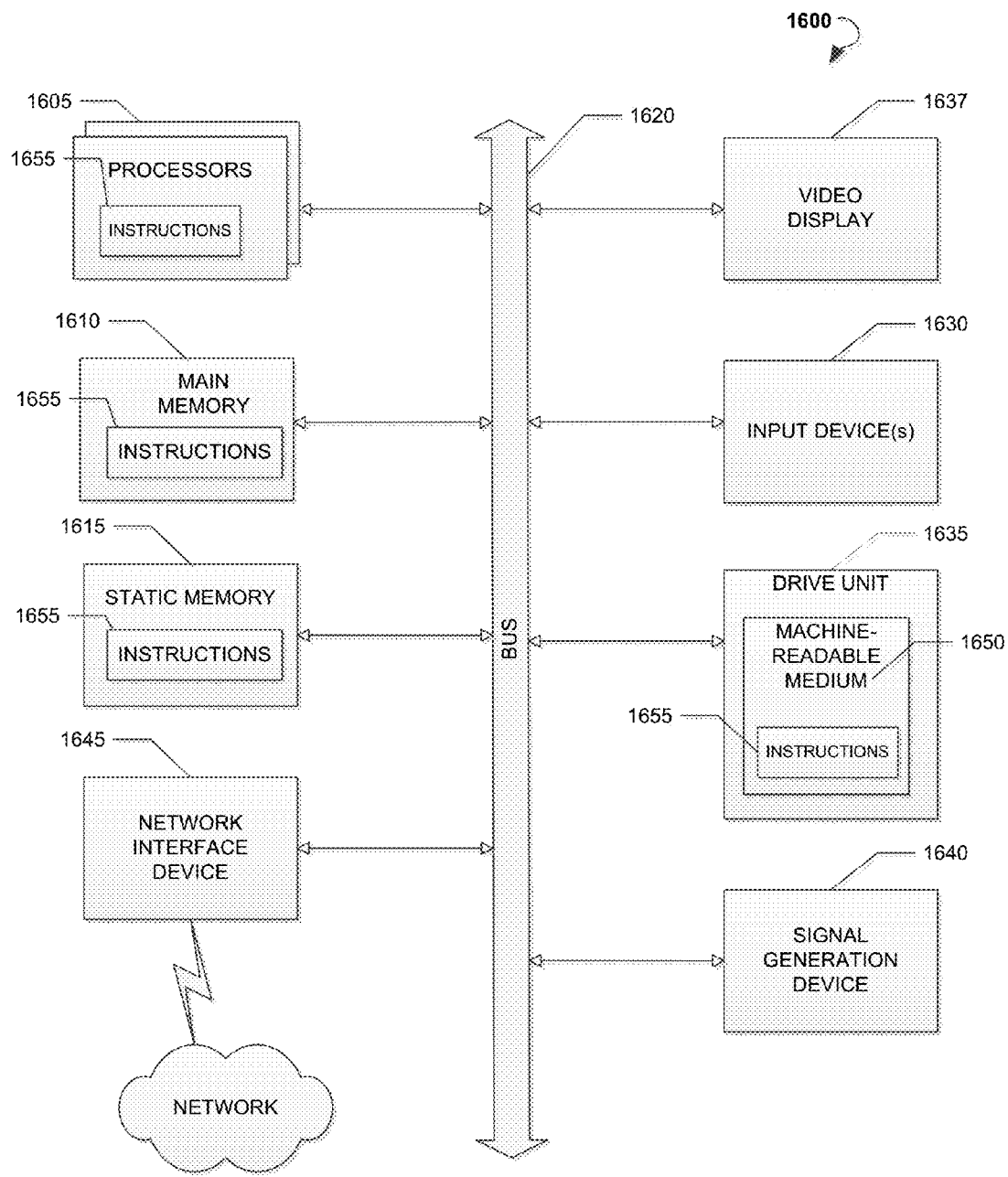
FIG. 16 is a diagrammatic representation of an example machine in the form of a computer system.

FIG. 16 is a diagrammatic representation of an example machine in the form of a computer system 1600, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor or multiple processors 1605 (e.g., a central processing unit (CPU), a graphics processing unit (GPU), or both), and a main memory 1610 and static memory 1615, which communicate with each other via a bus 1620. The computer system 1600 may further include a video display 1637 (e.g., a liquid crystal display (LCD)). The computer system 1600 may also include an alpha-numeric input device(s) 1630 (e.g., a keyboard), a cursor control device (e.g., a mouse), a voice recognition or biometric verification unit (not shown), a drive unit 1635 (also referred to as disk drive unit), a signal generation device 1640 (e.g., a speaker), and a network interface device 1645. The computer system 1600 may further include a data encryption module (not shown) to encrypt data.

The drive unit 1635 includes a computer or machine-readable medium 1650 on which is stored one or more sets of instructions and data structures (e.g., instructions 1655) embodying or utilizing any one or more of the methodologies or functions described herein. The instructions 1655 may also reside, completely or at least partially, within the main memory 1610 and/or within the processors 1605 during execution thereof by the computer system 1600. The main memory 1610 and the processors 1605 may also constitute machine-readable media.

The instructions 1655 may further be transmitted or received over a network via the network interface device 1645 utilizing any one of a number of well-known transfer protocols (e.g., Hyper Text Transfer Protocol (HTTP)). While the machine-readable medium 1650 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

According to some embodiments, the present disclosure can include security devices that utilize one or more cameras to capture images or video of an area proximate a computing device when an associated computing device has been moved or if individuals are proximate the computing device. Thus, the camera is reactive to one or more motion sensors that sense motion of the computer or individuals proximate the computer. In some embodiments, the camera can be rotated to point in a direction of the sensed movement.

As mentioned above with other embodiments, sensors can be integrated into the security device to provide sensing of infrared, temperature change, GPS location changes, and acceleration—just to name a few. As mentioned above, some other sensing technologies can include passive infrared, microwave, ultrasonic, tomographic, as well as other motion sensing technologies. Thus, the sensor(s) utilized within the security device can be configured not only to sense motion, but presence of a user through temperature-based and other biometric sensing capabilities.

Figure 17:
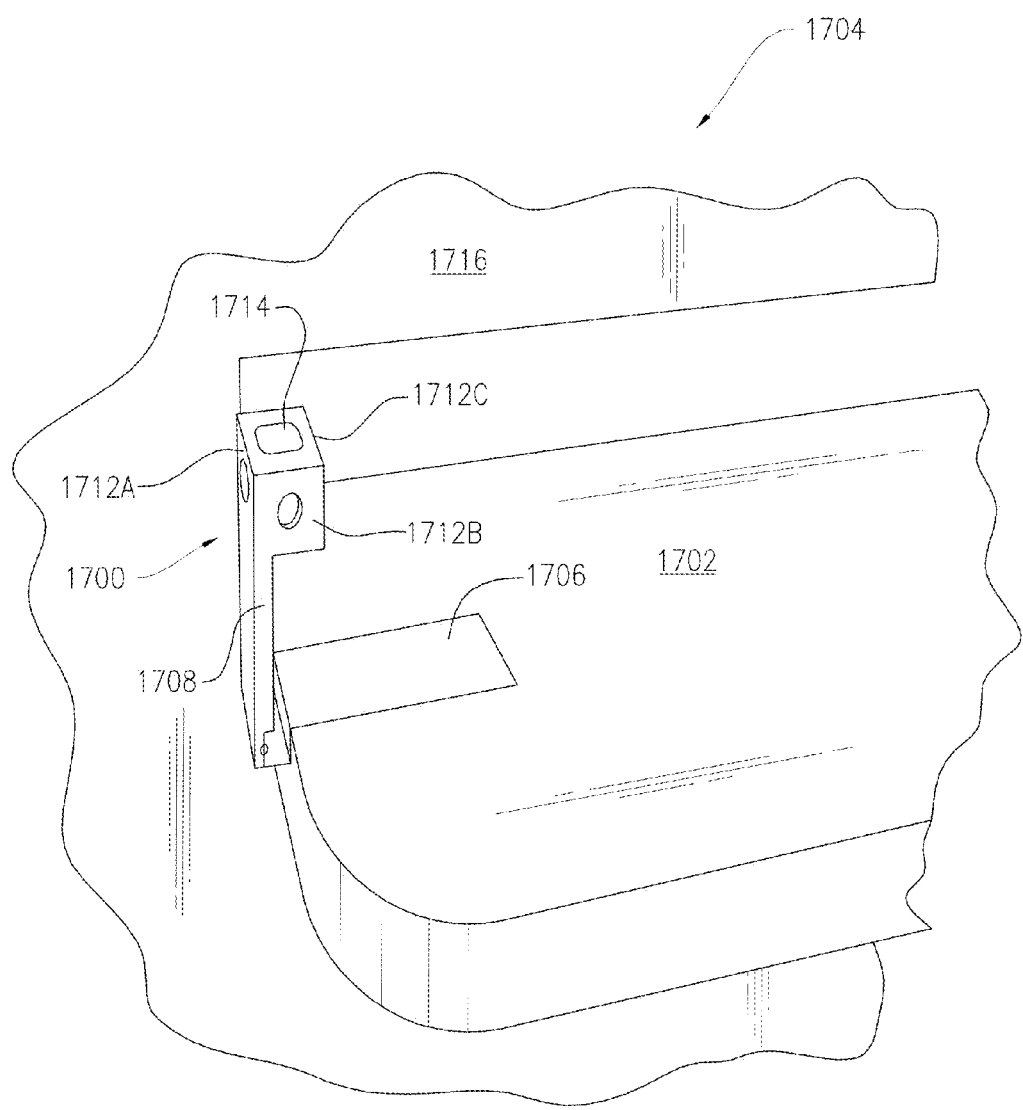
FIG. 17 is a perspective view of an example security device that is integrated into a chassis/housing of a computing device, in a deployed configuration.

FIG. 17 illustrates an example security device 1700 that is integrated into chassis 1702 of a computing device 1704 such as a laptop. The chassis 1702 comprises a notch 1706 that is sized to receive a housing 1708 of the security device 1700.

In some embodiments, the housing 1708 is hingedly connected to the chassis 1702. The security device 1700 can extend from a deployed configuration in FIG. 17 to a stored position as in FIG. 18.

Figure 21:
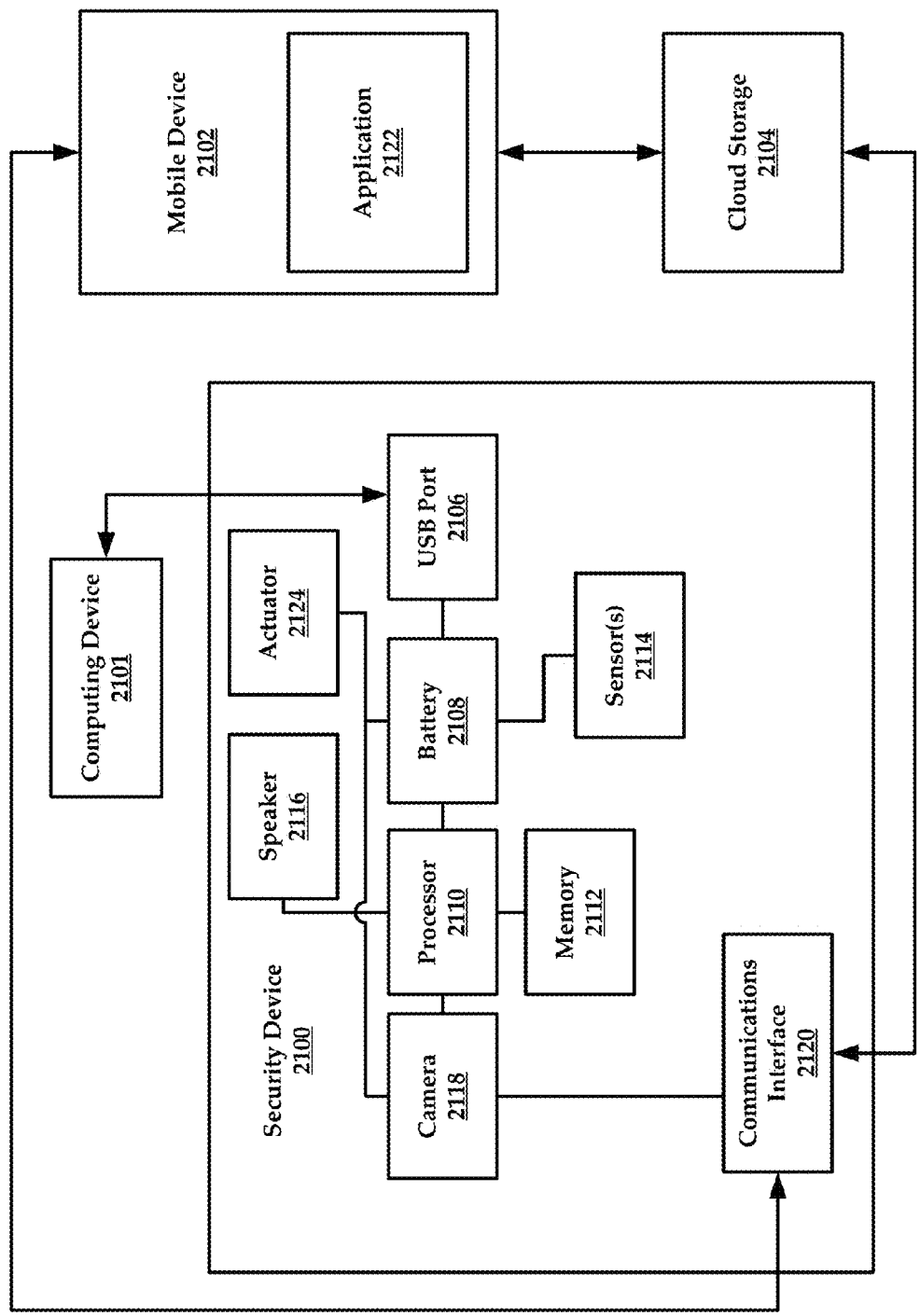
FIG. 21 is a schematic view of an example system that includes the components of a security device and other supporting network architecture.

The security device 1700 comprises a camera that includes one or more lenses. In this embodiment, the security device 1700 includes four lenses positioned on faces of the housing 1708. FIG. 17 illustrates only three faces and lenses 1712A-C, with the fourth face and lens being obscured in this view. In one embodiment, the camera can control all four lenses. In another embodiment, the security device 1700 can comprise a dedicated camera and lens for each face of the housing. Example schematic diagrams that include the camera and other components of the security device 1700 are illustrated in FIG. 21.

A motion sensor 1714 can be positioned above the camera and/or lenses 1712A-C in one embodiment. In some embodiments, each face can comprise its own sensor, such as embodiments where directionality of the sensor is important, such as ultrasonic sensors.

When motion or other presence sensing devices within the security device 1700 detect movement of a person or the computing device, or the presence of a person near the computing device, the security device 1700 can be configured to activate the camera to capture images or video of an area 1716 proximate the computing device 1704. In one embodiment, the security device 1700 can selectively use one or more of the lenses 1712A-C. For example, if motion or presence is sensed in front of lens 1712A, the security device 1700 can activate lens 1712A without activating the remaining lenses. In other embodiments, all cameras/lenses are activated simultaneously.

Additional details regarding the sensors that can be utilized in the embodiments of FIGS. 17-21 can be found in the descriptions of FIGS. 1-16 and will not be repeated in the interest of brevity. The sensors of FIGS. 1-16 can be similarly utilized in the embodiments of FIGS. 17-21.

Figure 19:
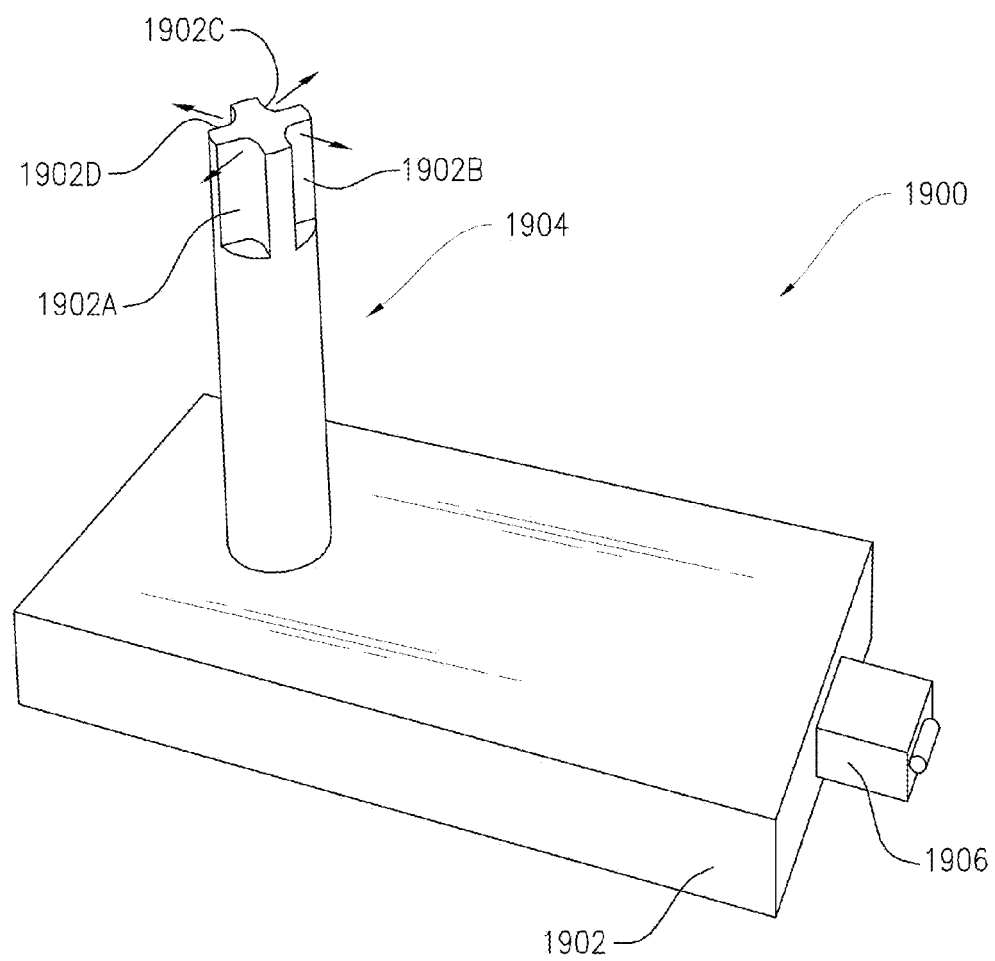
FIG. 19 is a perspective view of an example security device that can couple with a port of a computing device.

FIG. 19 is another embodiment of a security device 1900. The security device 1900 is a standalone device that can couple with a computing device (not illustrated). The security device 1900 generally comprises a housing 1902 and extension 1904 that houses portions of the security device 1900 such as camera lenses and/or sensors. The housing 1902 comprises an interface 1906 that provides for electrical and/or communicatively coupling with a port of a computing device. In one example, the interface 1906 comprises a USB adapter, although other adapters such as micro USB, serial port, and other example interfaces can be utilized.

Figure 18:
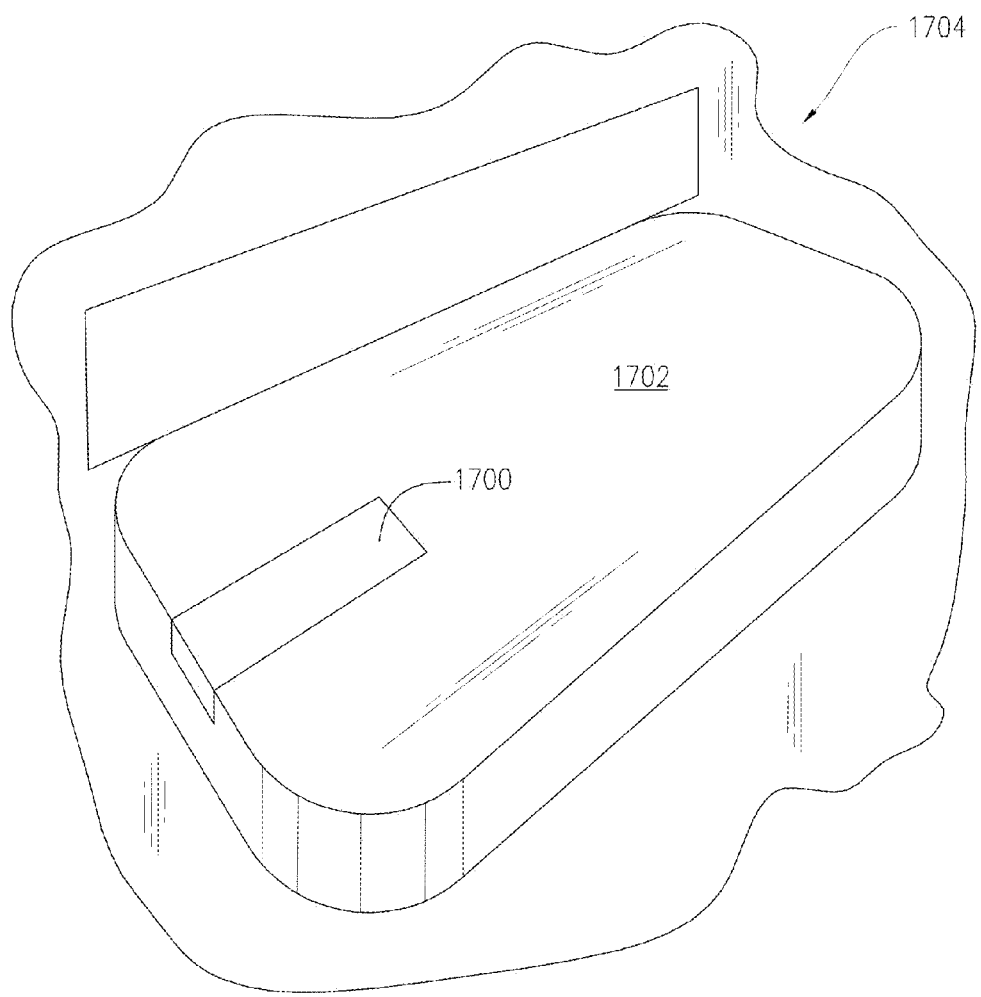
FIG. 18 is a perspective view of an example security device that is integrated into a chassis/housing of a computing device, in a stored configuration.

As with the embodiments of FIGS. 17 and 18, the security device 1900 comprises four lenses 1902A-D, which can be coupled with and controlled by one or more cameras. Again, the one or more cameras are controlled by a processor that is responsive to one or more sensors. In one embodiment, the security device 1900 can selectively use one or more of the lenses 1902A-D. For example, if motion or presence is sensed in front of lens 1902A, the security device 1900 can activate lens 1902A without activating the remaining lenses. In other embodiments, all cameras/lenses are activated simultaneously.

The extension 1904 comprises a tubular extension 1904 that extends orthogonally (other angles are also likewise contemplated) from the housing 1902. The camera and lenses 1902A-D can be positioned on a terminal end of the extension 1904. In some embodiments, the lenses 1902A-D are angularly offset from one another such that the camera can capture images in a plurality of directions relative to the computing device.

Figure 20:
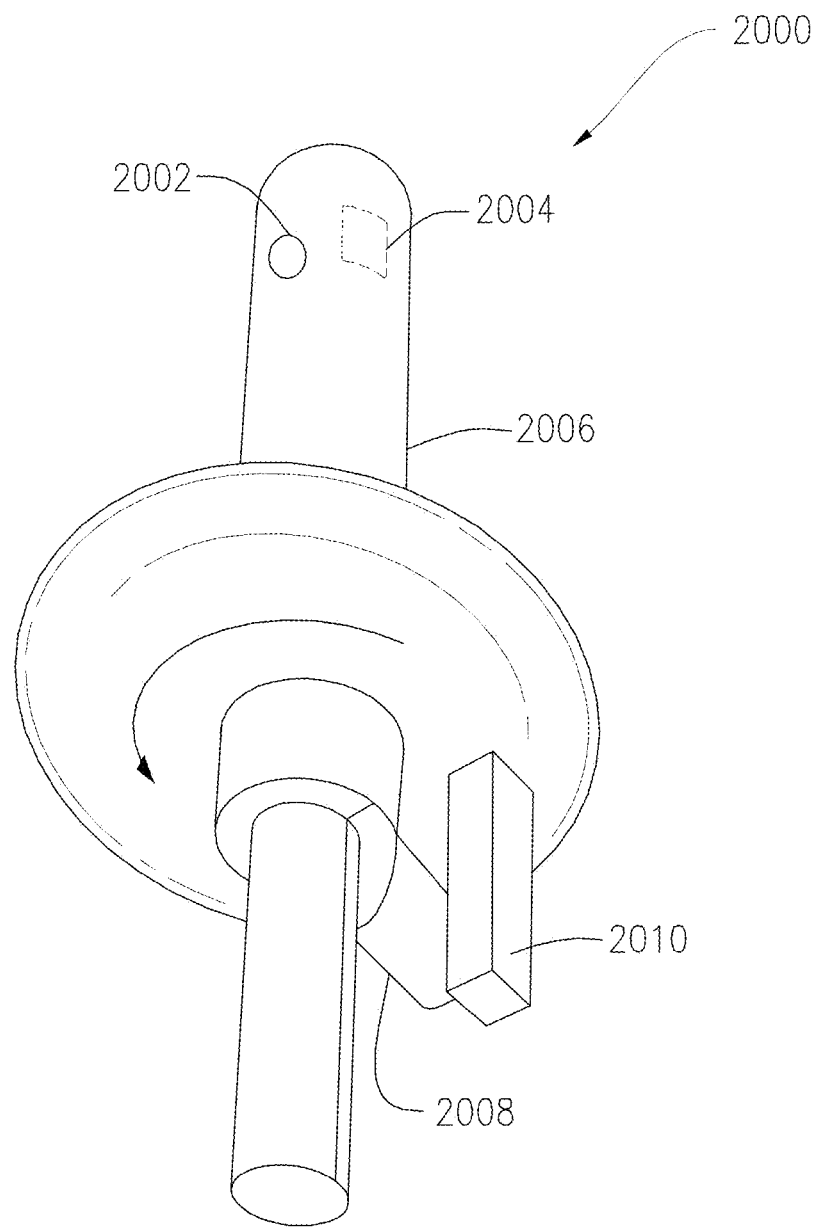
FIG. 20 is a perspective view of an alternative embodiment of a camera assembly for a security device.

FIG. 20 illustrates another example extension 2000 that comprises a single camera and lens 2002. The extension 2000 comprises one or more sensors 2004 disposed on a terminal end of the extension 2000. A tubular body 2006 of the extension 2000 can comprise a stop 2008 that limits rotation of the tubular body 2006 by engagement with a block 2010. Although shown in FIG. 21, the tubular body 2006 can be associated with a motor that rotates the tubular body 2006 and lens 2002. In some embodiments, when motion or presence of a user (or movement of the computing device) is sensed by the sensor 2004, the tubular body 2006 can be rotated to place the lens 2002 in a direction of the sensed motion or presence.

Also, the lens 2002 can be directed by a user through an application that executes on a mobile device (also illustrated in FIG. 21). In one embodiment, a user is alerted to motion or presence by the security device through direct communication of an alert to the mobile device or through a network, the user can utilize the mobile device to rotate the lens 2002 and survey the area proximate the computing device for individuals. For example, the sensor of the security device can detect motion or presence of a user near the computing device.

FIG. 21 is a schematic diagram of an example security device 2100, as well as a supporting network architecture. In general, the security device 2100 can cooperate with a mobile device 2102 and a cloud storage system 2104.

The security device 2100 can comprise a USB port 2106 in some embodiments, such as the embodiments of FIG. 19. Embodiments that are directly integrated into the chassis of the computing device need not include USB port 2106, though they can optionally be included. The security device 2100 can couple with a computing device 2101 through the USB port 2106. To be sure, the computing device 2101 is a device which is being monitored for movement by the security device 2100 (or for individuals proximate the computing device).

The security device 2100 can also comprise a rechargeable battery 2108 that can be electrically coupled with the USB port 2106 and charged via connection with a computing device 2101. The security device 2100 can also comprise a processor 2110 and memory 2112 for storing executable instructions that can be executed by the processor to cause the security device 2100 to perform functions such as camera activation, camera and/or lens rotation, as well as image or video transmission over a network connection or short range wireless connection such as Bluetooth.

A sensor 2114 can be coupled to the processor 2110. Again, the sensor 2114 can include one or more sensors that provide sensing of infrared, temperature change, GPS location changes, and acceleration—just to name a few. As mentioned above, some other sensing technologies can include passive infrared, microwave, ultrasonic, tomographic, as well as other motion sensing technologies. Thus, the sensor(s) utilized within the security device 2100 can be configured not only to sense motion, but presence of a user through temperature-based and other biometric sensing capabilities.

A speaker 2116 can be integrated into the security device 2100 and utilized to output a warning tone when motion or presence are sensed that meet or exceed certain criteria or thresholds as described in greater detail above.

A camera 2118 can be utilized to capture images and/or video when motion (of the computing device 2101 or a user) or presence of an individual is sensed by the sensor 2114 (or sensors 2114, in some embodiments). The camera 2118 can be controlled by the processor 2110 due to input/signals received by the processor 2110 from the sensor 2114. In some embodiments, the camera 2118 can include an Internet Protocol (IP) camera, a USB camera, a netcam, or other similar and/or conventional camera technologies.

The security device 2100 can also comprise a communications interface 2120 that allows the security device 2100 to transmit data to supporting network components such as the mobile device 2102 or the cloud storage system 2104.

For example, when motion or presence is sensed, the processor can execute the camera 2118 to obtain images or video of the area around the computing device 2101. These images or video are transmitted by the communications interface 2120 over a network connection to the cloud storage system 2104 or the mobile device 2102. The network connection can include any network connection described herein. In some embodiments, the video or image information can be transmitted to the computing device 2101 through the USB port 2106. The computing device 2101 can then transmit the image and/or videos to the cloud storage system 2104 or the mobile device 2102 rather than the security device 2100. The computing device 2101 can also store the images or videos locally for purposes of redundancy.

In one embodiment, video or image information can be transmitted to the cloud storage system 2104 for processing such as compression or codec conversion prior to sending the images or video to the mobile device 2102.

In another example, the images or video can be transmitted to the mobile device 2102 through a short range wireless connection such as Bluetooth.

As mentioned above, the mobile device 2102 can comprise an application 2122 that, when executed, allows the user to control functions of the security device 2100 remotely. For example, the user can utilize a control interface provided by the application 2122 to control a position or zoom of the camera 2118. As with the embodiments of FIGS. 19 and 20, the extension can be rotated to change the direction of view of the one or more lenses.

In some embodiments, the security device 2100 can comprise an actuator 2124 such as a motor other mechanism that can rotate an extension (e.g., tubular extension or body) of a security device, such as extension 1904 and extension 2000 of FIGS. 19 and 20, respectively.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A security device, comprising:
a sensor for detecting movement of a computing device to which the security device is coupled or movement of an individual proximate the computing device;
a transmitter;
a camera positioned on the computing device so as to capture an area proximate the computing device,
wherein the camera is mounted on an extension that extends from a housing of the security device, and
wherein the camera comprises a plurality of lenses that are mounted on an end of the extension and angularly offset from one another such that the camera can capture images or video in a plurality of directions relative to the computing device;
a processor; and
a memory for storing executable instructions, the processor executing the instructions to:
receive from the sensor a message indicative of the movement of the computing device or the movement of the individual proximate the computing device,
determine if the computing device has been moved or if the individual is proximate the computing device, using the message from the sensor,
control the camera to obtain the images or video of the area proximate the computing device, and
transmit the images or video through the transmitter to a mobile device of a user.

2. The security device according to claim 1, wherein the processor further executes the instructions to output a warning message using the transmitter, if the computing device has been moved or the individual proximate the computing device has moved.

3. The security device according to claim 1, wherein the sensor, transmitter, processor, and memory are disposed within the housing, wherein the security device further comprises a rechargeable battery disposed within the housing, the rechargeable battery in electrical communication with an interface that provides both electrical and communicative connection to a port of the computing device.

4. The security device according to claim 1, wherein the images or video are transmitted to cloud storage.

5. The security device according to claim 1, wherein the sensor comprises a passive infrared sensor that detects body heat from the individual proximate the computing device.

6. The security device according to claim 1, wherein the sensor comprises an ultrasonic sensor that senses the movement of the computing device relative to other objects adjacent to the computing device.

7. The security device according to claim 1, wherein the sensor comprises a microwave sensor that senses the movement of the computing device relative to other objects adjacent to the computing device.

8. The security device according to claim 1, wherein the sensor comprises a tomographic sensor or network of tomographic sensors.

9. The security device according to claim 1, wherein the processor further executes the instructions to pair the security device with a mobile device over a communications path, wherein a warning message is output by the transmitter to the mobile device over the communications path.

10. The security device according to claim 1, further comprising an audio output device, the audio output device being controlled by the processor to output a warning message as a warning tone.

11. The security device according to claim 1,
wherein the housing encloses the sensor, the processor, and the memory; and
wherein a clamp couples the housing to the computing device.

12. The security device according to claim 1, further comprising:
means for positioning the sensor proximate an object that is adjacent to the computing device, the means for positioning the sensor extending from the housing.

13. The security device according to claim 1, wherein a warning message is output and comprises at least two or more of an audible warning, a visual warning, a textual warning, or any combinations thereof.

14. The security device according to claim 1, wherein the processor further executes the instructions to:
evaluate the message from the sensor to determine if the computing device has been gyrated rather than moved; and
cause either an audio device to output a warning signal that the computing device has been gyrated or the transmitter to output a signal that is indicative that the computing device has been gyrated.

15. The security device according to claim 1, wherein the security device is integrated into a protective cover that is configured to enclose at least a portion of the computing device.

16. The security device according to claim 1, further comprising a locking interface that is configured to secure the security device to the computing device so as to make removal of the security device from the computing device difficult.

17. A security system, comprising:
a security device comprising:
a sensor for detecting movement of a computing device or movement of an individual proximate the computing device;
means for communicatively coupling the sensor with the computing device; and
a camera configured to capture images or video of an area proximate the computing device,
wherein the camera is mounted on an extension that extends from a housing of the security device, and
wherein the camera comprises a plurality of lenses that are mounted on an end of the extension and angularly offset from one another such that the camera can capture the images or video in a plurality of directions relative to the computing device; and
the computing device comprising:
a processor; and
a memory for storing executable instructions, the processor executing the instructions to:
receive from the sensor a message indicative of the movement of the computing device or the movement of the individual proximate the computing device,
determine if the computing device has been moved or if the individual is proximate the computing device, using the message from the sensor,
control the camera to obtain the images or video of the area proximate the computing device, and transmit the images or video to a mobile device of a user.

18. The security system according to claim 17, wherein the extension is rotatable, and further wherein the plurality of lenses are rotatable to point in a direction of the movement sensed by the sensor.

19. The security system according to claim 17, wherein the security device is hingedly connected to the housing of the computing device and folds from a stored configuration to a deployed configuration.

\* \* \* \* \*